D. YOST.
SUBSOILER ATTACHMENT.
APPLICATION FILED APR. 7, 1913.

1,162,842.

Patented Dec. 7, 1915.

WITNESSES:

INVENTOR
David Yost.
BY
ATTORNEY

UNITED STATES PATENT OFFICE.

DAVID YOST, OF SWANTON, NEBRASKA.

SUBSOILER ATTACHMENT.

1,162,842.  Specification of Letters Patent.  Patented Dec. 7, 1915.

Application filed April 7, 1913. Serial No. 759,435.

*To all whom it may concern:*

Be it known that I, DAVID YOST, a citizen of the United States, residing at Swanton, in the county of Saline and State of Nebraska, have invented certain new and useful Improvements in Subsoiler Attachments, of which the following is a specification.

This invention is an attachment for subsoilers designed to prevent the same from becoming clogged by roots and dirt clinging thereto, and the object of the invention is to provide an attachment for this purpose which is simple in construction, and efficient in operation. This object is attained by means of the device to be hereinafter described and claimed, and in order that the same may be fully understood, reference is had to the accompanying drawing, in which—

Figure 1:
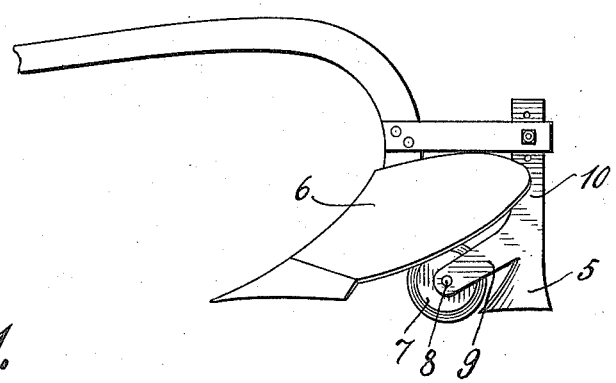
Figure 2:
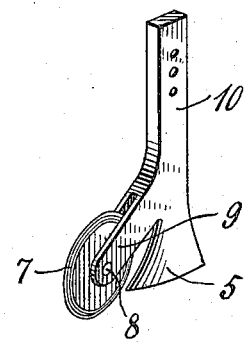

Figure 1 is an elevation of a plow provided with the device. Fig. 2 is a perspective view of the subsoiler and the attachment thereof removed from the plow.

Referring specifically to the drawing 5 denotes a subsoiler which trails behind the lister 6, to which latter it is secured in any suitable manner. Between the subsoiler and the lister is located the device whereby the former is prevented from clogging, said device comprising a rotatable disk 7 which is sharpened so that it will readily cut through roots and other trash. The disk is journaled on an axle 8 carried by a bifurcated arm 9, extending forward from the standard 10 of the subsoiler, and the disk is set so that it enters the ground a sufficient distance to reach the roots.

In planting corn it very often happens that roots and dirt cling to the subsoiler and clog the same, so that the planter is raised out of the ground. With the herein described attachment this tendency of the subsoiler to clog is entirely done away with, the roots, dirt and trash being cut up by the disk before they reach the subsoiler.

I claim:

A plow attachment comprising a standard having its lower extremity tapered to form a laterally flattened subsoiler sharpened at its forward edge, the standard being provided above the subsoiler with an integral forwardly and downwardly extending arm bifurcated at its extremity, and a disk mounted rotatably in the bifurcation and extending below the bottom of the subsoiler and in the same vertical plane.

In testimony whereof I affix my signature in presence of two witnesses.

DAVID YOST.

Witnesses:
A. F. PINONKA,
S. C. CALDWELL.